United States Patent Office 3,650,932
Patented Mar. 21, 1972

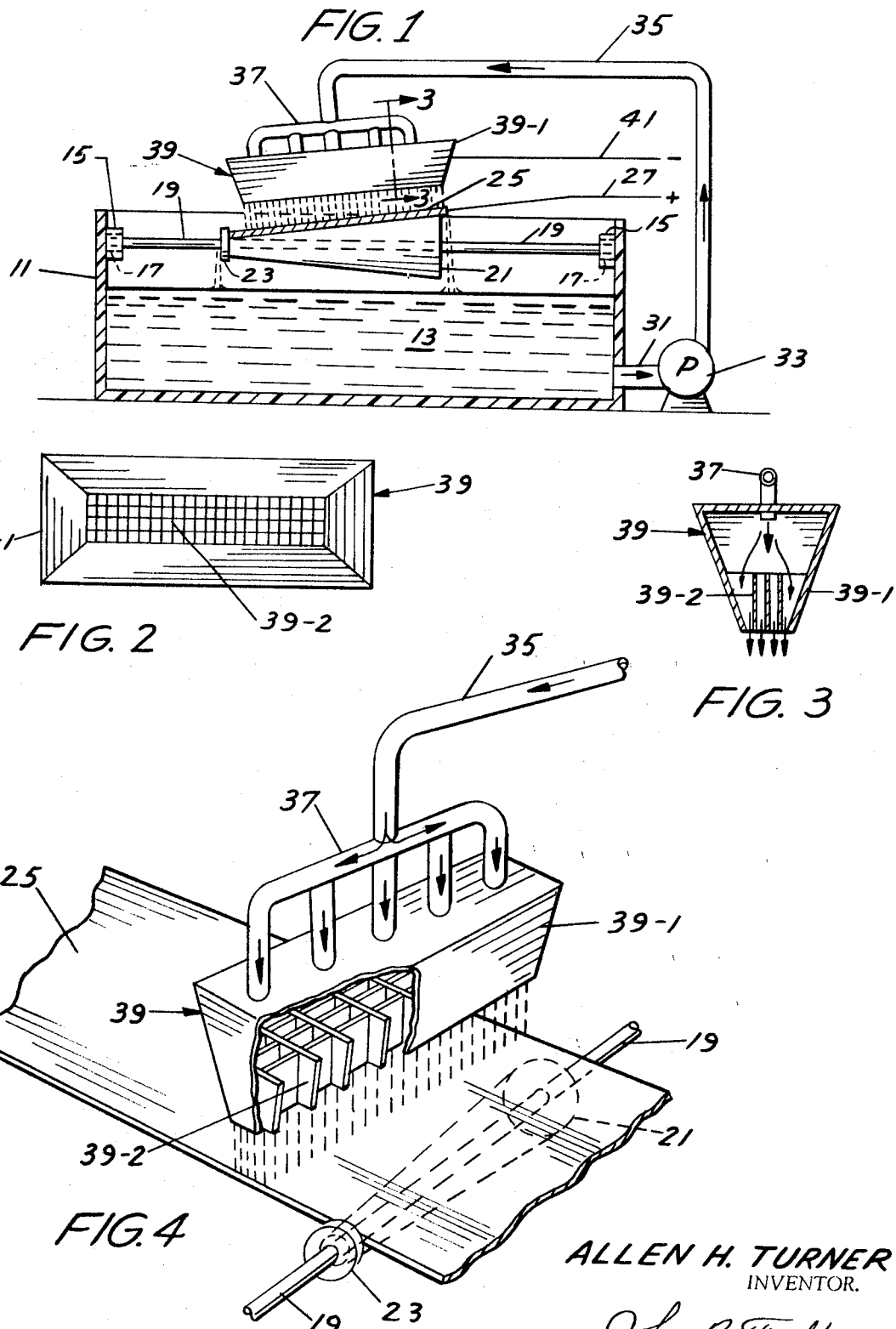

3,650,932
ELECTRO-FLOW COATING METHOD
Allen H. Turner, Ann Arbor, Mich., assignor to Ford
Motor Company, Dearborn, Mich.
Continuation-in-part of application Ser. No. 643,127,
June 2, 1967. This application Nov. 3, 1969, Ser.
No. 873,555
Int. Cl. B01k 5/02; C23b 13/00
U.S. Cl. 204—181                                    1 Claim

ABSTRACT OF THE DISCLOSURE

In a method for electrodepositing an organic, film-forming coating material wherein a stream of an aqueous dispersion of the coating material is passed from a first electrode to an electrically conductive workpiece which serves a second electrode of a coating circuit, a difference of electrical potential is provided between the first electrode and the second electrode and unidirectional electric current is passed between the first electrode and second electrode through said stream, the improvement wherein a plurality of streams of the aqueous dispersion are separately passed in contact with the first electrode and converged into a single stream before contacting the workpiece.

---

This application is a continuation-in-part of copending application Ser. No. 643,127, filed June 2, 1967, now abandoned.

BACKGROUND OF THE INVENTION

Electrodeposition of organic materials including natural and synthetic polymers is well known in the art. More recently, with the development of specially tailored paint binder resins, the electrodeposition of paint has been disclosed in the literature and currently is accounting for a significant volume of industrial painting. In this method of painting, a binder resin, with which pigments, organic or mineral filler, etc., may be incorporated, is dispersed in an aqueous coating bath with the aid of a dispersal assistant. The dispersal assistant is a compound which in the presence of the water causes functional groups of the binder resin to ionize. In the main, the resins employed for this purpose are synthetic polycarboxylic acid resins, i.e., synthetic organic resins having dissociable carboxyl groups in their molecular structure. These are dispersed in water with a water-soluble base, preferably a water-soluble amine. Other water-soluble bases such as ammonia, potassium hydroxide, lithium hydroxide, etc., can be used. The workpiece serves as one electrode of the coating circuit and is immersed in the bath while a unidirectional electric current is passed through the bath between the workpiece and another electrode. A number of these resins and the process above described are disclosed by U.S. Pat. 3,230,162. The disclosures of this patent are incorporated herein by reference. Other suitable resin formulations are disclosed in a large number of later issued patents, e.g., U.S. Pat. 3,369,983 and U.S. Pat. 3,297,557. Cathodically depositable resins are also known. These have ionizable groups in their molecular structure which exhibit positive sites upon dispersion in an aqueous bath, e.g., amine groups. A water-soluble acid, e.g., acetic acid, can be used as a dispersal assistant where such groups are basic.

In the process above described, each coating composition has what is termed in the art a "threshold voltage" and a "rupture voltage" with a given workpiece under a given set of coating conditions, e.g., spacing of electrodes, bath resistivity, etc. The former refers to that voltage at which significant electrodeposition of the coating material is initiated. The latter relates to that voltage which under the coating conditions employed will provide an average current density at the surface of the workpiece immersed in a bath of the aqueous dispersion of the coating material that exceeds the maximum tolerable average current density for electrodepositing a continuous film of at least about 0.5 mil thickness of said coating material upon said workpiece without film rupture when said workpiece is immersed in said dispersion and moved through the coating bath at a rate of speed of less than about 40 feet per minute.

Movement through a coating bath is, of necessity, relatively slow, ordinarily less than about 40 feet per minute for most workpieces in conventional installations. This is particularly true when the workpieces are of a configuration which would create excessive turbulence at higher rates of movement. Electrodeposition rate is also limited by the maximum tolerable average current density that can be utilized without destroying the quality of the film deposited. While initial current density is relatively quite high until an electrically resistant film builds upon the workpiece, the tolerable average current density for most available coating compositions of the types herein described is below about 5 amperes per square foot of immersed workpiece. Most industrial painting installations are now operated with an average current density between deposition initiation and deposition temination of approximately 3 amperes per square foot.

It has been disclosed that one may electrophoretically deposit inorganic coatings by supporting a conductor in a jet of the coating material in contact with another electrode. See, for example, U.S. Pat. 2,699,426. A method for coating small metal articles are moved through a downwardly directed stream of the suspension is disclosed in U.S. Pat. 3,361,658. Conventional immersion coating voltages are employed.

SUMMARY OF THE INVENTION

The method of this invention is an improvement of the method of coating wherein the workpiece passes through an aqueous stream that is in contact with an opposing electrode and in which the organic coating material is dispersed. In the method of this invention, a plurality of streams of the coating dispersion separately pass in contact with and issue from a first electrode and converge prior to contacting the workpiece. The continuous stream flow assists in heat removal and film protection.

BRIEF DESCRIPTION OF THE DRAWING

FIG. 1 is a partially sectional assembly view of one embodiment of coating apparatus which can be used for carrying out the method of this invention;

FIG. 2 is a bottom view of the electrode assembly shown in FIG. 1;

FIG. 3 is a sectional end view of the electrode assembly shown in FIGS. 1 and 2; and FIG. 4 is an enlarged, partially sectional view of a portion of the coating apparatus shown in FIG. 1 further illustrating the internal construction of the interior of the electrode assembly of this embodiment.

DESCRIPTION OF THE PREFERRED EMBODIMENTS

In the illustrated embodiment of FIGS. 1–4 inclusive there is shown a coating tank 11 containing an aqueous bath 13. In this embodiment, bath 13 is prepared in the following manner:

An extended coupled glyceride drying oil paint binder is made by reacting in an agitator tank 8,467 parts of alkali-refined linseed oil and 2,025 parts of maleic anhydride (heated together at 323.2° C. for about three hours until an acid value of 80–90 results), then cooling this intermediate to 157.2° S., adding 1,789 parts of vinyl toluene containing 48 parts of ditertiary butyl peroxide and reacting at 218.3° C. for about an hour. The resulting vinyl toluenated material is then cooled to 157.2° C. and 5,294 parts of non-heat reactive, thermoplastic, oil-soluble phenolic resin is added, the temperature raised to 232.2° C. and the mixture held one hour. The phenolic resin is a solid lump resin having softening point of 120–150° C., specific gravity of 1.03–1.05 at 20° C., and has been stripped to get out excess phenol and low molecular weight materials. It is a condensation product of about equimolar quantities of para tertiary butyl phenol and formaldehyde. The electrical equivalent weight of the resulting acid resin as extended is about 1,640, and it has acid number of 65.

The material then is cooled to 93.3° C., and 1,140 parts are taken for forming a paint dispersion. To these 1,140 parts, 100 parts of water are added, then 13.6 parts of triethylamine, the mixture agitated for a few minutes, then 74 more parts of water and 92.5 parts diisopropanol amine added. This mixture is further reduced with 1,825 parts water and 32.5 parts diethylene triamine while agitation is continued.

To this paint dispersion there is added 50 parts of a treating mixture of mineral spirits, a light hydrocarbon liquid having A.P.I. gravity of 45–49.5, specific gravity at 15.6° C. of 0.78–0.80, flash point (Cleveland Open Cup) between 37.8–46° C., a negative doctor test and no acidity, 12 parts of a wetting agent (the oleic ester of sarcosine, having a maximum of 2% free fatty acid, a specific gravity of 0.948, color on the Gardner scale of 6, and a molecular weight of 340–350). This material is compatible with the paint dispersion; no distinct hydrocarbon phase results either at this time, even though a substantial amount of hydrocarbon (predominantly aliphatic) has been used, nor after further addition of the pigment grind and addition of extra water to make the initial painting bath.

A pigment grind is made from 123 parts of vinyl-toluenated, maleic-coupled linseed oil made in the same manner as the resin hereinbefore shown in this example (except that the resulting polycarboxylic acid resin is not extended with the phenolic resin), 8.4 parts of diisopropanol amine, 0.7 part of an antifoam agent (a ditertiary acetylenic glycol with methyl and isopropoyl substitution on the tertiary carbon atoms), 233 parts of fine kaolin clay, 155 parts of pigmentary titanium dioxide, 7.8 parts of fine lead chromate, 15.5 parts of fine red iron oxide, 16.9 parts of carbon black, and 201 parts of water. The resulting pigment grind is then blended with the foregoing paint dispersion and treating mixture to make a concentrated paint. The resulting paint is reduced further with water in the ratio of one part of the resulting paint per 5 parts of water to make an initial paint bath for electropainting operations. The resulting bath has resin solids (non-volatile matter) concentration of 7.24%. The total of amine equivalents used in making up the initial bath is about 4.5 times the minimum amount necessary to keep this polycarboxylic acid resin, once dispersed, in anionic polyelectrolyte condition in the bath and about 1.25 times full neutralization of the acid resin with respect to its acid number. The number of coulombs of direct current used to electroplate a gram of this resin on an anode at minimum amine concentration in the bath to develop requisite polyelectrolyte characteristics for my coating process is virtually constant at 24. Specific resistance of the initial bath is about 900 ohm-centimeters.

The replacement paint solids are made by dispersing 1,140 parts of the same kind of extended polycarboxylic acid resin with 100 parts of water and 13.6 parts of triethylamine. To this is added the mineral spirits, the wetting agent, and the foregoing pigment grind, all of the same compositions and in proportions as are used to make up the original paint dispersion for the bath.

Mounted on the upper side walls of tank 11 are brackets 15 which support bearings 17. Rotatably mounted within bearings 17 is shaft 19 upon which is fixedly mounted a tapered roller 21. Tapered roller 21 has affixed at its smaller end flange 23 which extends outwardly from this end of the roller to prevent the workpiece 25, an electrically conductive sheet material, resting on roller 21 from sliding off the roller 21 as it is propelled over bath 13 causing roller 21 to rotate on shaft 19. Workpiece 25 is in electrical connection with a positive terminal of a direct current electrical power source, not shown, via conductor 27 and serves as the anode of the illustrated coating proces.

A portion of the bath 13 is continuously withdrawn from tank 11 via conduit 31 and passed via pump 33, conduit 35, and feed distributor 37 to cathode assembly 39.

Cathode assembly 39 comprises a housing 39–1 into which the aqueous coating bath empties from the plurality of conduits of feed distributor 37. Housing 39–1 is substantially V-shaped in this embodiment, i.e., narrowing toward its lower portion from whence the coating material is discharged as continuous streams upon the workpiece 25. As more fully shown in FIGS. 2, 3 and 4, housing 39–1 contains a grill-work cathode 39–2 which separates the dispersion of coating material introduced into housing 39–1 into a plurality of streams and provides high surface area contact between coating dispersion and cathode in relation to the volume of the flow issuing from the cathode assembly at any given time. Cathode assembly 39, more specifically cathode 39–2, is in electrical connection with a negative terminal of a direct current electric power source via conductor 41. It will be understood that the polarities of conductors 27 and 41 are reversed when a cathodically depositable resin is electrodeposited. While a single cathode assembly is shown in FIG. 1, it will be understood that a plurality of such units may be employed to permit more rapid movement of the workpiece.

Broken lines are employed in FIGS. 1 and 4 to indicate generally liquid flow from cathode to anode. In the preferred embodiment, separate streams of the coating dispersion issue from cathode 39–2 and merge into a single stream prior to contact with anode 25. Cathode 39–2 is spaced from anode 25 a distance of less than about 10 inches, advantageously not greater than about 4 inches, and preferably not greater than about 2 inches. The differences of electrical potential between cathode and anode is advantageously in the range of about 400 to 1,000 volts. Bath resistivity is ordinarily in the range of about 500 to about 1,000 ohm-cm. In the illustrated embodiment, the spacing is about 2 inches, the difference of potential is about 400 volts, and the individual streams issuing from cathode 39–2 are about ¼ inch in diameter prior to merging.

In this application, "painting" by electrodeposition is meant to include the deposition of finely ground pigment and/or filler in the ionizable resin herein referred to as the binder, the deposition of binder without pigment and/or filler or having very little of same, but which can be tinted if desired, and the deposition of other water reducible surface coating compositions containing the binder which might be considered to be broadly analogous to enamel, varnish, or lacquer bases, and the coating material for such deposition is termed a "paint." Thus, the binder, which is converted to a water-resistant film by the electrodeposition and ultimately converted to a durable film resistant to conventional service conditions by final curing, can be all or virtually all that is to be deposited to form the film, or it can be a vehicle for pigmentary and/or mineral filler material or even other resins on which it exerts the desired action for depositing the film. Suitable resins include but are not limited to those specifically listed in U.S. Pat. 3,230,162 to A. E. Gilchrist. The preferred resins for anodic deposition have an acid number between about 30 and about 300 and an electrical equivalent weight between about 1,000 and about 20,000. The term "electrical equivalent weight" is employed herein to mean that amount of resin or resin mixture that will deposit per Faraday of electrical energy input. The conditions, procedures, and calculations which can be employed to determine electrical equivalent weight are set forth in detail in the afore-mentioned U.S. Pat. 3,230,162.

While the coating materials heretofore described herein and the films electrodeposited therefrom are conventionally cured by conventional curing techniques such as baking, it will be understood that it is within the scope of this invention to electrodeposit coating compositions which are also adapted for radiation polymerization, e.g., by an electron beam having an average potential in the range of about 150,000 to about 450,000 electron volts. Such resins, in addition to the ionizable carboxylic acid groups of the resins heretofore described, have about 0.5 to about 3 alpha-beta olefinic unsaturation units per 1,000 units molecular weight. Examples of such resins and methods for their preparation are described in my copending United States patent application Ser. No. 666,338, filed Sept. 7, 1967, now U.S. Pat. No. 3,501,391, a continuation-in-part of application Ser. No. 583,885, filed Oct. 3, 1966 and now abandoned, in which I am a co-inventor with Arthur G. Smith.

The term "unidirectional electric current" as employed herein is meant to include rectified alternating current as well as direct electric current in its purest sense, e.g., current produced by a direct electric current generator.

The foregoing examples are solely for the purpose of illustration and are not to be considered as limitations upon the true scope of the invention set forth in the appended claim.

I claim:

1. In a method for electrodepositing paint wherein a stream of an aqueous dispersion of paint is passed from a first electrode of an electrical circuit to an electrically conductive workpiece which serves as a second electrode of said coating circuit, a difference of electrical potential is provided between said first electrode and said second electrode and unidirectional electric current is passed between said first electrode and said second electrode through said stream, the improvement wherein a plurality of streams of the aqueous dispersion are separately passed in contact with said first electrode and converge into a single stream before contacting the workpiece.

References Cited
UNITED STATES PATENTS 3,361,658    1/1968    Tanner _____ 204—181

HOWARD S. WILLIAMS, Primary Examiner